No. 776,134. PATENTED NOV. 29, 1904.
R. H. HASSLER.
SPEED CONTROLLING MECHANISM FOR AUTOMOBILES OR THE LIKE.
APPLICATION FILED JUNE 13, 1904.
NO MODEL. 4 SHEETS—SHEET 1.
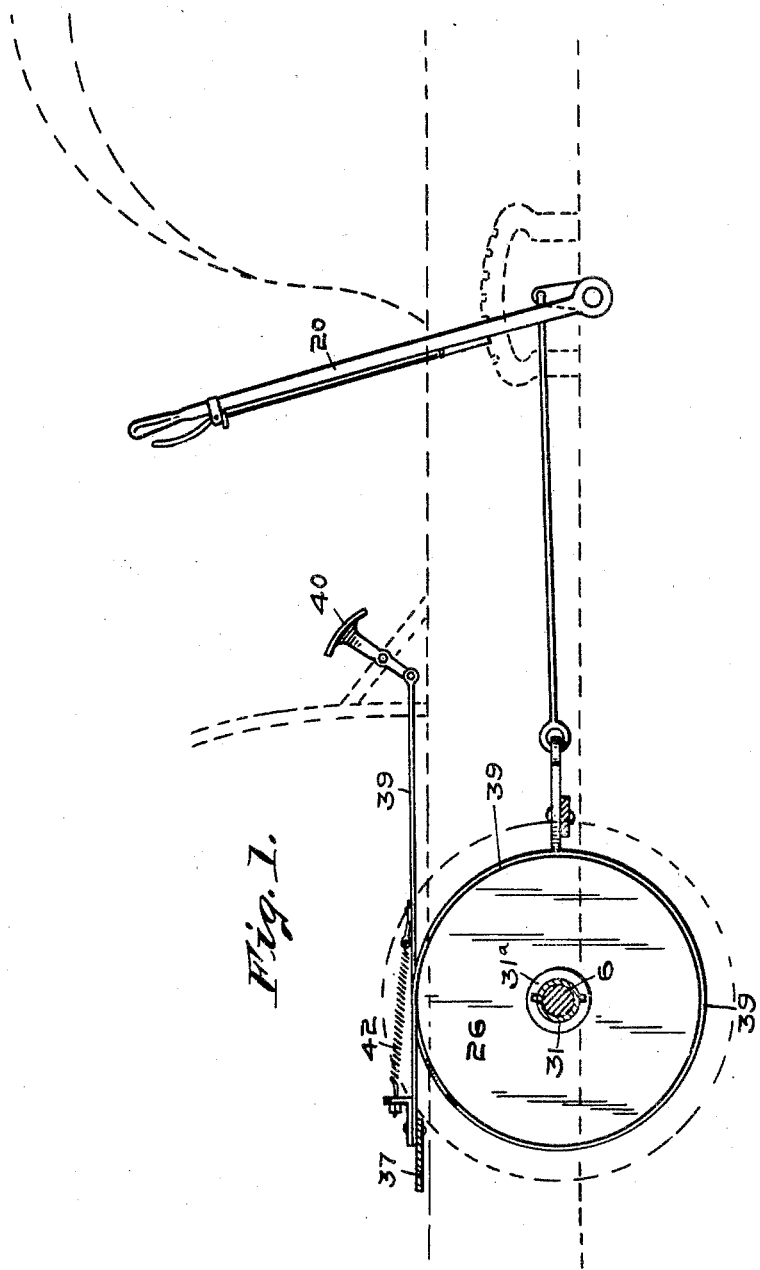
Witnesses
F. W. Woerner.
H. A. Ortt
Inventor
Robert H. Hassler,
by Joseph A. Minturn.
Attorney

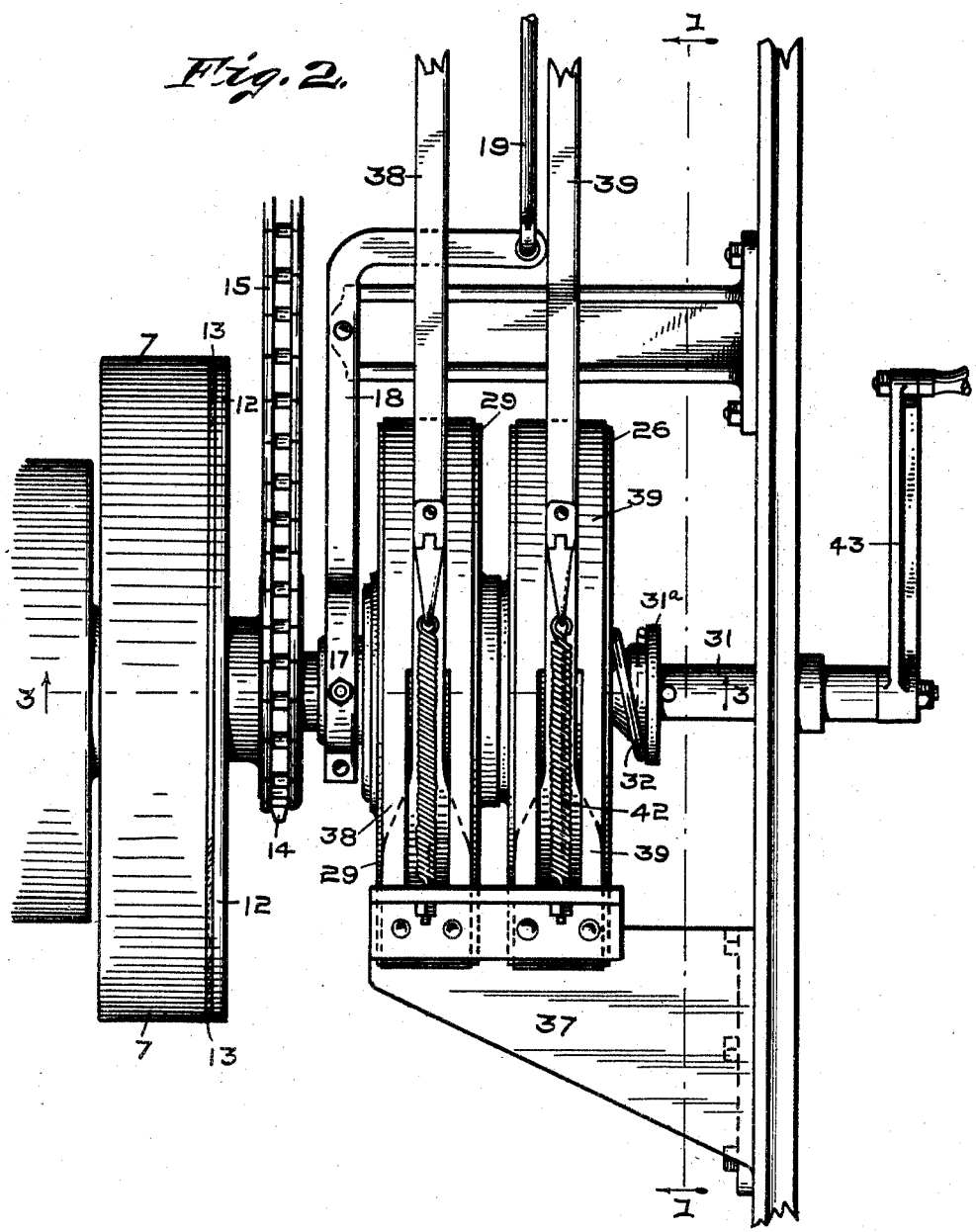

No. 776,134. PATENTED NOV. 29, 1904.
R. H. HASSLER.
SPEED CONTROLLING MECHANISM FOR AUTOMOBILES OR THE LIKE.
APPLICATION FILED JUNE 13, 1904.
NO MODEL. 4 SHEETS—SHEET 3.
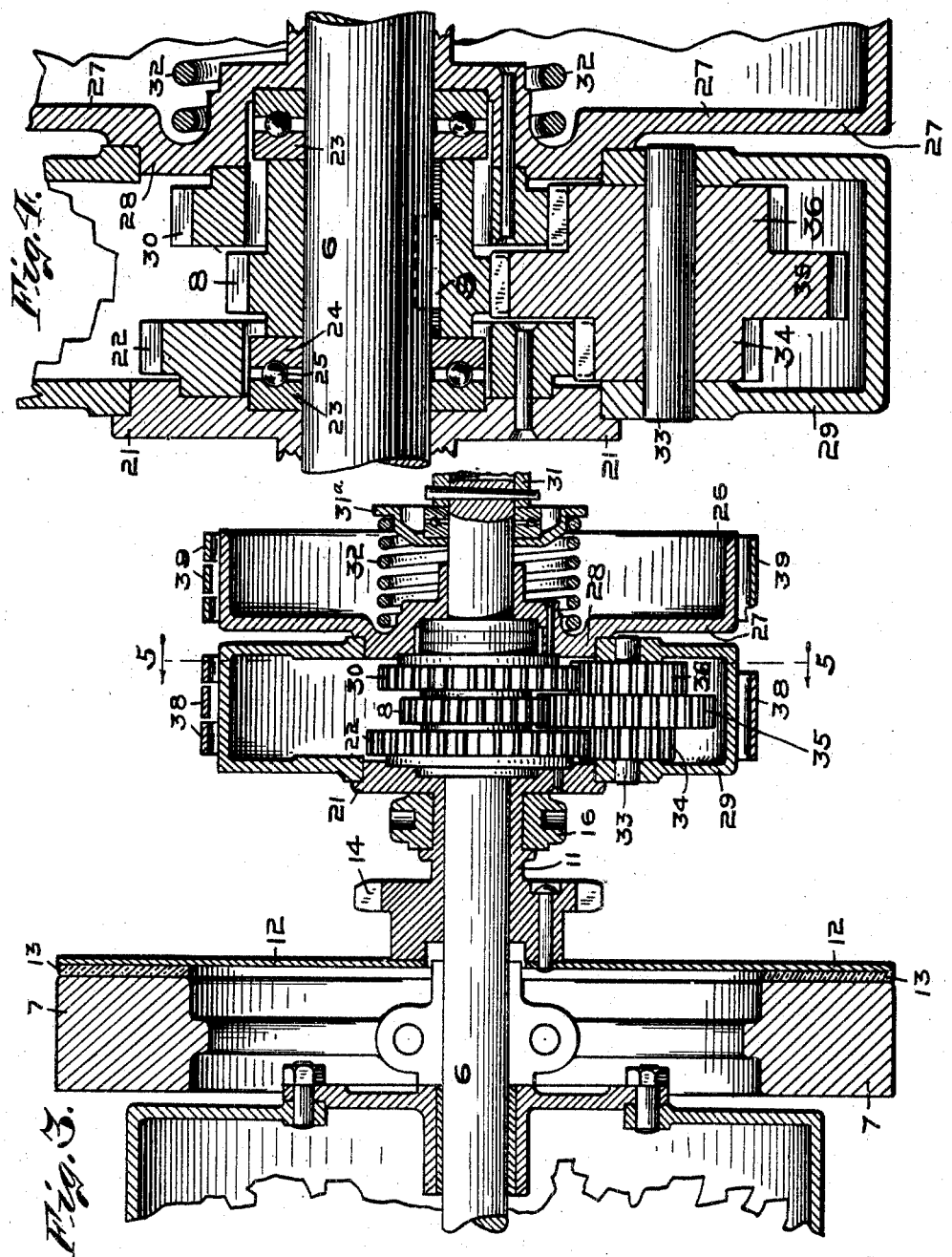
Inventor
Robert H. Hassler,
Witnesses
F. W. Werner.
H. A. Orth.
by Joseph A. Minturn
Attorney

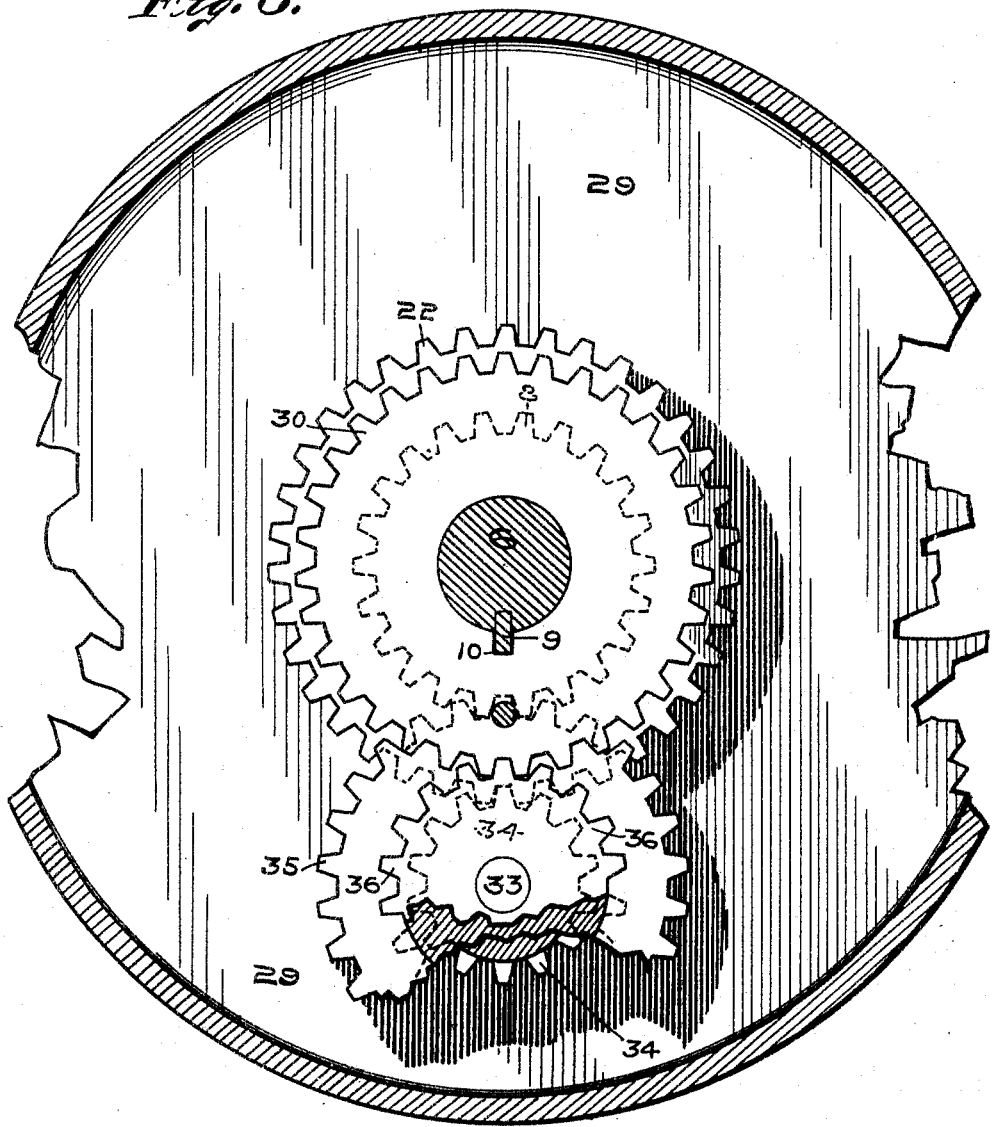

No. 776,134. Patented November 29, 1904.

UNITED STATES PATENT OFFICE.

ROBERT H. HASSLER, OF INDIANAPOLIS, INDIANA, ASSIGNOR TO MARION MOTOR CAR COMPANY, OF INDIANAPOLIS, INDIANA, A CORPORATION OF INDIANA.

SPEED-CONTROLLING MECHANISM FOR AUTOMOBILES OR THE LIKE.

SPECIFICATION forming part of Letters Patent No. 776,134, dated November 29, 1904.

Application filed June 13, 1904. Serial No. 212,389. (No model.)

*To all whom it may concern:*

Be it known that I, ROBERT H. HASSLER, a citizen of the United States, residing at Indianapolis, in the county of Marion and State of Indiana, have invented certain new and useful Improvements in Speed-Controlling Mechanism for Automobiles or the Like, of which the following is a specification.

This invention relates to a speed-controlling device in a mechanism for automobiles or the like wherein a driving and a driven shaft are connected by transmitting-gear and two drums concentric with the driving-shaft are each capable of being locked against rotation, in one of which drums the driven shaft is journaled, so that when said drum is locked against rotation the driven shaft will be held in a fixed location, but permitted by its rotation and that of the gears keyed thereon to transmit slower rotary movement with increased power from the driving-shaft to a sprocket-sleeve connected by link belt with the automobile-axle, and whereas the other drum carries a gear concentric with the driving-shaft and gearing with the gears of the driven shaft, so that when said drum is locked against rotation and the first drum is rotated the driven shaft and gears carried thereby will be carried around the driving-shaft with a planetary motion and will transmit a reverse motion from the driving-shaft to said sprocket-sleeve. When running in a normal forward direction, power is transmitted to said sprocket-sleeve, through a friction-clutch, from a fly-wheel fixed on the driving-shaft and the drums and gearing above mentioned are inactive, but are brought into service when the motion is reversed or is to be slowed down with an increase in power. In both of the latter cases transmission to the sprocket-sleeve through the fly-wheel is interrupted by opening the friction-clutch; and one of the prime objects of my invention is to provide a practical means whereby power may be transmitted at the will of the operator to the driving-sprocket without passing through a speed-controlling mechanism or may be transmitted through said speed-controlling mechanism.

Another object is to provide ball-bearings to keep the running parts from crowding together and binding.

The object also is to provide a simple and durable speed-controller capable of quick and positive control.

I accomplish the objects of the invention by the mechanism illustrated in the accompanying drawings, in which—

Figure 1 is a detail in vertical section on the line 1 1 of Fig. 2, showing a drum and the friction-band by which it is locked and released and showing the foot-lever and straining-rod for manipulating the friction-band; Fig. 2, a detail plan view showing the controlling-drums and the friction-bands and accessories respectively operating them; Fig. 3, a longitudinal section of the drums and flywheel shown in Fig. 2 on the line 3 3 of the latter figure, the view showing the gear-wheels in elevation; Fig. 4, a detail in section, on a larger scale, of the drum in which the driven shaft is journaled, showing the driving and the driven shafts and the gear mechanism mounted thereon, the latter being in section in this view; Fig. 5, a section on the line 5 5 of Fig. 3, showing the gear-wheels in elevation and broken away in part.

Like characters of reference indicate like parts throughout the several views of the drawings.

6 is the driving-shaft, and 7 is a fly-wheel which is clamped in a fixed manner thereon.

8 is a spur-gear mounted on the shaft 6. The latter has the spline 9, which enters the splineway 10 in the gear 8, whereby the latter is allowed an adjustment longitudinally of the shaft 6.

11 is a sleeve mounted loosely on the shaft 6. It has the disk 12 of the same diameter as the fly-wheel and is adapted to make friction contact with the side of said rim. This contact is increased by the interposition of the leather facing 13 attached to the disk. The sleeve has the sprocket-wheel 14, which is connected by chain 15 with the axle of the automobile (not shown) or other mechanism to be driven.

16 is a two-part collar mounted in a suitable run on sleeve 11. It has sockets to receive the pins of yoke 17 on the end of the bell-crank lever 18. The latter is connected by rod 19 with the hand-lever 20. (See Fig. 1.)

The sleeve 11 has the annular flange 21, to which the spur-gear 22 is riveted. Between the flange 21 and the hub of the spur-gear 8 are the two annular disks 23 and 24, having annular grooves in their adjacent faces to form runs for the balls 25. These disks and ball-bearings are duplicated at the other end of the hub of gear 8, as shown in Figs. 3 and 4.

Mounted loosely on shaft 6, next to the last-named bearing-disks, is the drum 26. Its web 27 has the annular extension 28 concentric with shaft 6, which, with the face of flange 21, forms the bearings for the drum 29. A spur-gear 30 is riveted to this extension 28. The gears 22 and 30 are concentric with shaft 6, and the bores of their hubs are large enough to clear the mechanisms between them and said shaft.

Mounted on shaft 6, outside of drum 26, is the spring-plate 31ª, and pinned to the shaft is the ring 31. Between plate 31ª and the web 27 is the spiral spring 32, which presses all of the above-described mechanism mounted on shaft 6 over against the fly-wheel 7 and creates a normal friction contact between said fly-wheel and the leather-faced disk 12 and gives to the automobile a normal movement "ahead," except when the friction contact is broken by the compression of said spring as a result of a movement of bell-crank lever 18 and lever 20. Between ring 31 and plate 31ª are the disks and ball-bearings, same as described, to relieve the friction.

Journaled in the drum 29 is the driven shaft 33, which is parallel with the driving-shaft 6, and mounted on said driven shaft 33 are the spur gear-wheels 34, 35, and 36, which mesh with the gears 22, 8, and 30, respectively. The gears 34, 35, and 36 are fastened together and are preferably integral. The relative diameters of the several gears are clearly shown in Figs. 3 and 4.

Secured to a stationary bracket 37 are the friction-bands 38 and 39, which pass around the peripheries of drums 29 and 26, respectively, and are connected with the foot-levers 40. By means of its band either of said drums may be locked against rotation and the other allowed to run free, or they may both be allowed to run free, as they do when the mechanism is going ahead at normal speed. The loosening of the bands to release the drums is insured by the action of the springs 42 42.

43 (shown in Fig. 2) is the ordinary removable crank by which the engine is started.

The operation of my invention is as follows: With the driving-shaft in motion, the friction-bands loose on drums 29 and 39, and the lever 20 free the spring 32 will force the mechanism between it and the fly-wheel 7 over toward the latter, thereby making friction connection between the fly-wheel and disk 12, so as to drive the sprocket-wheel 14, connected by sleeve 11 with said disk, ahead at its highest or engine speed. When it is desired under the above conditions to gain power at the expense of speed, as in hill-climbing or on bad roads, the friction-coupling is broken by moving the hand-lever 20 so as to shift the bell-crank lever and accessories, and then the drum 29 is locked against rotation by tightening up the friction-band 38 by a throw of its foot-lever, the other drum being allowed to run free. The shaft 33 then becomes fixed. Its gear 35 is driven by the smaller gear 8, the latter being splined to shaft 6. The smaller gear 34, integral with gear 35, engages and drives the gear 22, which is a fixed part of the sleeve-carrying sprocket 14. The gear 22 is larger than any of those named in its driving-train, and they are all proportioned relatively to accomplish the desired purpose of increasing the power. When it is desired under the condition of said normal movement ahead to reverse the motion, the connection between the fly-wheel and disk 12 is broken, as described in the preceding paragraph, and then the drum 26 is locked against rotation by tightening the friction-band 39, the drum 29 being allowed to run free. Gear 30 being thus held stationary, the gear 36 on shaft 33 is forced to roll around in a planetary manner, and owing to the difference in gear ratio between the pairs of gears 30 36, 8 (the driving-gear splined to driving-shaft 6) 35, (integral with gear 36,) and 22 (fixed to the sprocket-sleeve 11) 34, (integral with gears 35 and 36,) the gear 22 is allowed to move backward faster than will compensate for the forward drive from the gear 8, with the result that the sprocket-sleeve 11 is driven in a reverse direction to the movements above described and at a slower speed.

Having thus fully described my invention, what I claim as new, and wish to secure by Letters Patent of the United States, is—

1. In a speed-controller for automobiles and the like, a driving-shaft, a fly-wheel mounted in a fixed manner thereon, a spur-gear splined to said shaft, a drum mounted loosely on said shaft at one side of said gear having a web with an annular extension concentric with the shaft and adjacent to the said gear, a concentric spur-gear secured to said extension, a sleeve mounted loosely on said shaft between the fly-wheel and the splined gear, said sleeve having a disk adapted to make driving friction with the fly-wheel and having an annular flange on its opposite end from said friction-disk, a sprocket-wheel fixed to said sleeve, a spur-gear fastened concentrically of said shaft to said sleeve-flange, a second drum mounted on the said extension from the first drum and the annular flange on said sleeve, a second shaft journaled in the last drum eccentrically of the first shaft, spur-gears which are integral with each other, mounted on said second shaft and meshing with respective ones of the three above-named gears, means for throwing said friction-coupling into and out of contact and means for locking either one of said drums against rotation while the other is left to run free.

2. In a speed-controller for automobiles and the like, a driving-shaft, a fly-wheel clamped thereto, a sleeve mounted on the shaft having a disk to make friction contact with the fly-wheel and having an end flange, a spur-gear secured to said end flange, a sprocket fixed to said sleeve, a spur-gear splined to said shaft so as to have adjustment longitudinally thereof, a drum surrounding said splined gear, a second shaft journaled in said drum eccentric to the first shaft, a second drum mounted on the first shaft, said drum having a web, a spur-gear secured to said web concentric with the first shaft, gears integral with each other mounted on said second shaft and meshing with respective ones of the three above-named gears, a spring to press the above mechanism as a whole longitudinally of the first shaft toward the fly-wheel, antifriction thrust-bearings located at the ends of the splined gear, means for compressing said spring and breaking said friction contact between the disk and fly-wheel, and means for locking either one of said drums against rotation while the other is left to run free.

3. In a speed mechanism for automobiles and the like, a driving-shaft, a fly-wheel mounted in fixed manner thereon, a sleeve mounted loosely on said shaft, a sprocket-wheel fixed to said sleeve, means for driving the sleeve from the fly-wheel, a pair of drums mounted concentrically of the shaft, a second shaft journaled in one of said drums eccentrically of the first shaft, a train of spur-gears connecting said sleeve and a drum with the second shaft and the second shaft with the first shaft, means for interrupting the direct power transmission from the fly-wheel to the said sleeve, and means for holding either one of said drums against rotation while the other drum runs free.

4. In a speed mechanism for automobiles and the like, a driving-shaft, a fly-wheel mounted in a fixed manner thereon, a sleeve mounted loosely on said shaft, a sprocket-wheel fixed to said sleeve, means for driving the sleeve from the fly-wheel, a pair of drums mounted concentrically of the shaft, a second shaft journaled in one of said drums eccentrically of the first shaft, a train of spur-gears connecting said sleeve and one drum with the second shaft and the second shaft with the first shaft, means for interrupting the direct power transmission from the fly-wheel to the said sleeve, means for holding either one of said drums against rotation while the other drum is free and said mechanism as a whole being adjustable to and from said fly-wheel.

5. A driving-shaft, a fly-wheel mounted in a fixed manner thereon, a sleeve loosely mounted on the shaft, a sprocket-wheel fixed on said sleeve, means for driving the sleeve from the fly-wheel, a pair of drums mounted concentrically of the shaft, a second shaft journaled in one of said drums eccentrically of the first shaft, a train of spur-gears connecting said sleeve and a drum with the second shaft and the second shaft with the first shaft, means for interrupting the direct power transmission from the fly-wheel to the said sleeve, the above mechanism as a whole being adjustable to and from said fly-wheel, a spring to press said mechanism toward said fly-wheel and means for holding either one of said drums against rotation while the other drum runs free.

6. In a driving mechanism for automobiles and the like, a driving-shaft, a fly-wheel mounted in a fixed manner thereon, a sleeve loosely mounted on the shaft, a sprocket-wheel fixed on said sleeve, means for driving the sleeve from the fly-wheel, a pair of drums mounted concentrically of the shaft, a second shaft journaled in one of said drums eccentrically of the first shaft, a train of spur-gears connecting said sleeve and a drum with the second shaft and the second shaft with the first shaft, means for interrupting the direct power transmission from the fly-wheel to the said sleeve, the above mechanism as a whole being adjustable to and from said fly-wheel, a spring to press said mechanism toward said fly-wheel, ball-bearings between the independently-moving parts located in the direction of the pressure of said spring and means for holding either one of said drums against rotation while the other drum runs free.

7. In a driving mechanism for automobiles and the like, a driving-shaft, a fly-wheel mounted in a fixed manner thereon, a sleeve, a friction-disk fixed on said sleeve to engage the fly-wheel, a sprocket fixed to said sleeve, a speed-controlling mechanism connected with said disk comprising a pair of drums and spur-gears mounted concentrically of said shaft, a second shaft journaled eccentrically of said driving-shaft in one of the drums, and spur-gears on said second shaft meshing with those of the first shaft, said disk and speed-controlling mechanism being adjustable in a body to and from the fly-wheel, and means to hold one or the other of said drums against rotation.

8. In a driving mechanism for automobiles and the like, a revoluble driving-shaft, a fly-wheel mounted in a fixed manner thereon, a sleeve, a friction-disk fixed on said sleeve to engage the fly-wheel, a sprocket fixed to said sleeve, a speed-controlling mechanism connected with said disk comprising a pair of drums and spur-gears mounted concentrically of said shaft, a second shaft journaled eccentrically of said driving-shaft in one of the drums, and spur-gears on said second shaft meshing with those of the first shaft, said disk and speed-controlling mechanism being adjustable in a body to and from the fly-wheel, a spring to press said mechanism normally against the fly-wheel, means to resist the spring and break said contact and means to hold one or the other of said drums against rotation.

9. In a driving mechanism for automobiles and the like, a revoluble shaft, a fly-wheel mounted in a fixed manner thereon, a sleeve, a friction-disk fixed on said sleeve to engage the fly-wheel, a sprocket fixed to said sleeve, a speed-controlling mechanism connected with said disk comprising a pair of drums and spur-gears mounted concentrically of said shaft, a second shaft journaled eccentrically of said driving-shaft in one of the drums, spur-gears on said second shaft meshing with those of the first shaft, said disk and speed-controlling mechanism being adjustable in a body to and from the fly-wheel, a spring to press said mechanism normally against the fly-wheel, means to resist the spring and break said contact, antifriction thrust-bearings located in the direction of the pressure of said spring and means to hold one or the other of said drums against rotation while the other runs free.

In witness whereof I have hereunto set my hand and seal, at Indianapolis, Indiana, this 19th day of May, A. D. 1904.

ROBERT H. HASSLER. [L. S.]

Witnesses:
  JOSEPH A. MINTURN,
  F. W. WOERNER.